United States Patent [19]
Kingdon et al.

[11] Patent Number: 6,029,070
[45] Date of Patent: Feb. 22, 2000

[54] SELECTION OF POSITIONING HANDOVER CANDIDATES BASED ON PATH LOSS

[75] Inventors: Christopher H. Kingdon, Garland; Bagher R. Zadeh; Gunnar Borg, both of Dallas, all of Tex.

[73] Assignee: Ericsson Inc., Research Triangle Park, N.C.

[21] Appl. No.: 08/992,296

[22] Filed: Dec. 17, 1997

[51] Int. Cl.[7] .................................................. H04Q 1/00
[52] U.S. Cl. ........................... 455/456; 455/436; 455/525
[58] Field of Search .................................... 455/436, 440, 455/456, 525, 67.1

[56] References Cited

U.S. PATENT DOCUMENTS

| | | | |
|---|---|---|---|
| 5,513,246 | 4/1996 | Jonsson et al. | 455/443 |
| 5,564,079 | 10/1996 | Olsson | 455/456 |
| 5,613,205 | 3/1997 | Dufour | 455/440 |
| 5,657,487 | 8/1997 | Doner | 455/456 |
| 5,666,662 | 9/1997 | Shibuya | 455/456 |
| 5,809,430 | 9/1998 | D'Amico | 455/525 |
| 5,878,328 | 3/1999 | Chawla et al. | 455/67.1 |

FOREIGN PATENT DOCUMENTS

| | | |
|---|---|---|
| 0 800 319 A1 | 4/1996 | European Pat. Off. . |
| WO 93/12623 | 6/1993 | WIPO . |
| WO 97/27711 | 7/1997 | WIPO . |

OTHER PUBLICATIONS

Mende, Wolf R., Evaluation of a Proposed Handover Algorithm for the GSM Cellular System, IEEE, 1990, pp. 264–269.

*Primary Examiner*—Dwayne D. Bost
*Assistant Examiner*—Erika A. Gary
*Attorney, Agent, or Firm*—Jenkens & Gilchrist

[57] ABSTRACT

A method, apparatus, and system for the selection of target nodes in locating a receiver is disclosed. The receiver measures the strength of signals transmitted by a number of nodes. The received strength is subtracted from the transmitting power of the nodes to determine the respective path losses. The node with the lowest path loss is selected as the target node. The target node is then used to perform a triangulation for determining the location of the receiver.

20 Claims, 4 Drawing Sheets

| n | BTS | Received Signal strength (dBm) | Output power (dBm) | Path loss (dB) | Rank by path loss |
|---|------|-----|----|-----|---|
| 1 | 420d | −80 | 40 | 120 | 1 |
| 2 | 420c | −89 | 51 | 140 | 4 |
| 3 | 420a | −90 | 51 | 141 | 5 |
| 4 | 420e | −92 | 40 | 132 | 2 |
| 5 | 420b | −94 | 51 | 145 | 6 |
| 6 | 420f | −98 | 40 | 138 | 3 |

SELECTION OF POSITIONING HANDOVER CANDIDATES BASED ON PATH LOSS

BACKGROUND OF THE PRESENT INVENTION

1. Field of the Invention

The present invention relates generally to telecommunications systems and methods for determining the location of a mobile terminal within a wireless network, and specifically to an improved method, system, and apparatus for determining nodes which are the likeliest to yield the most accurate triangulation results.

2. Background and Objects of the Present Invention

Determining the geographical position of a mobile station within a wireless network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

Referring now to FIG. 1 of the drawings, an exemplary wireless network, such as a Global System for Mobile Communication (GSM) Public Land Mobile Network (PLMN) 10, will be described. The PMLN 10 is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Referring now to FIG. 2, the operation of a wireless network 205 performing a positioning handover for determining the location of a given MS 200 is described. Upon a network positioning request, the Base Station System (BSS) (220 and 240) serving the MS 200 generates positioning data, which is delivered to the Mobile Switching Center (MSC) 260. This positioning data is then forwarded to a Positioning Center (PC) 270 for calculation of the geographical location of the MS 200. The location of the MS 200 can then be sent to the application 280 that requested the positioning. Alternatively, the requesting application 280 could be located within the MS 200 itself. The Positioning Center 270 could also be located within the MSC 260.

In order to accurately determine the location of the MS 200, positioning data from three separate Base Transceiver Stations (210, 220, and 230) is required. This positioning data for GSM systems includes a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle can be used, instead of the TA value of GSM systems.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.a., BTSs 210, 220, and 230, the location of the MS 200 can be determined with a certain degree of accuracy. For example using a triangulation algorithm, with knowledge of the three TA values and site location data associated with each BTS (210, 220, and 230), the position of the mobile station 200 can be determined (with certain accuracy) by the Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

If there are more than three BTSs (210, 220, and 230) within the range of the MS 200, the serving BSC 240 will have to determine to which two BTSs 210 and 230 to perform a positioning handover (in order to obtain the TA values). In addition, if the serving BTS 220 does not support positioning, three target BTSs must be selected. At present, this selection process is typically performed by the BSC 240 compiling a mobile assisted handover list based on measurements obtained by the MS 200 regarding the signal strength of the surrounding BTSs (210, 220 and 230). The BSC 240 then selects the two or three BTSs (220 and 230) with the strongest signal strength to perform a positioning handover.

Unfortunately, the selected BTSs (210, 220, and 230) may not be the ideal candidates for obtaining positioning data. For example, if the BTSs (210, 220, and 230) selected for positioning handovers do not surround the mobile station 200 to be positioned, the error in the location calculation will increase.

It is therefore an object of the invention to determine the target BTSs that are the likeliest to yield the best triangulation results.

It is also an object of the invention to determine the target BTSs in a manner that is computationally simple.

It is also an object of the invention to determine the target BTSs in a manner that requires minimal modifications to existing cellular networks.

SUMMARY OF THE INVENTION

The present invention is directed to a method for determining target nodes that are the likeliest to yield the best triangulation results by determining the strength of signals received at the receiver from various nodes, determining the strength of the signals at the nodes, and calculating a path loss for each node by subtracting the strength of the signal at the receiver from the strength of the signal at the target node. The present invention is also directed to a telecommunication system for determining the location of a mobile station including Base Transceiver Stations for transmitting a signal to the mobile station, path loss measurements for measuring the path loss of each Base Transceiver Stations, and selection of at least two of the Base Transceiver Stations with the lowest path loss. The present invention is also directed to an apparatus for selecting target Base Transceiver Stations with memory for the output power of Base Transceiver Stations, inputs for receiving a measurement report measuring the strength of signals received at a receiver, and a way to calculate the path loss of each Base Transceiver Station, and for selecting at least two Base Transceiver Stations having the lowest path loss.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
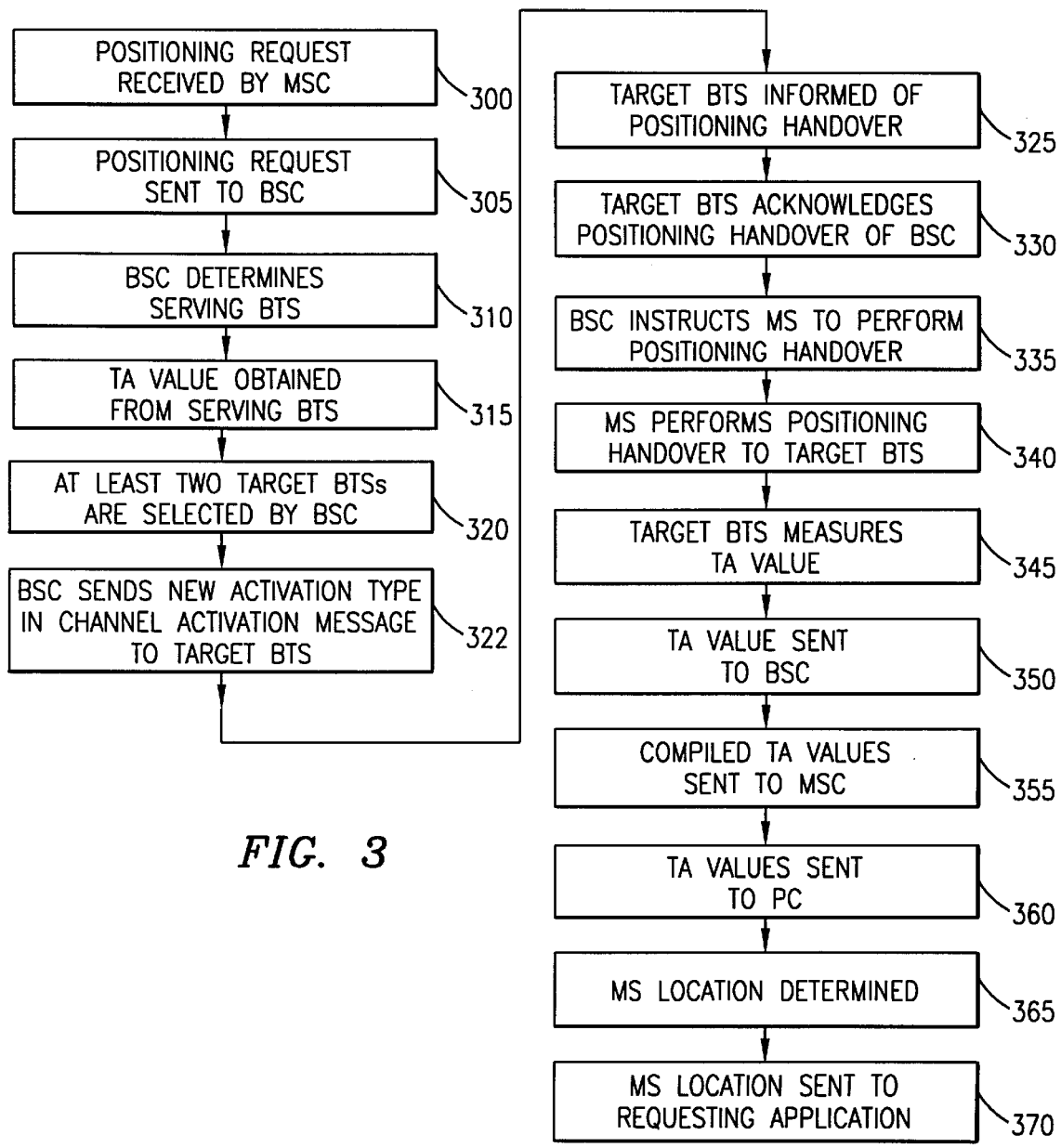
FIG. 3 is a flow chart demonstrating steps in a sample embodiment of the target base station determination of the present invention.

With reference now to FIG. 3 of the drawings, steps in a sample process for determining the optimal base transceiver stations in order to locate a Mobile Station 200 within a Location Area 205 is illustrated. Initially, after a positioning request is received by the MSC 260 (step 300) from the Positioning Center 270, the MSC 260 sends the positioning request to an originating (serving) Base Station Controller (BSC) 240 (step 305) if the Mobile Station 200 is in a dedicated mode (in use). However, if the MS 200 is in an idle mode (not in use), the MSC 260 must page the MS 200 and setup a call to the MS before forwarding the positioning request to the BSC. This call does not activate the ringing tone on the MS 200, and therefore, is not noticed by the MS 200.

The originating BSC 240 then determines which Base Transceiver Station (BTS) 220 is currently serving the MS 200 (step 310), and obtains a Timing Advance (TA) value (TA1), or other positioning data, from this serving BTS 220 (step 315), if possible. Thereafter, TA values are obtained from two target BTSs (210 and 230) (step 350) by performing a positioning handover (step 335). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

Figures 4, 5:
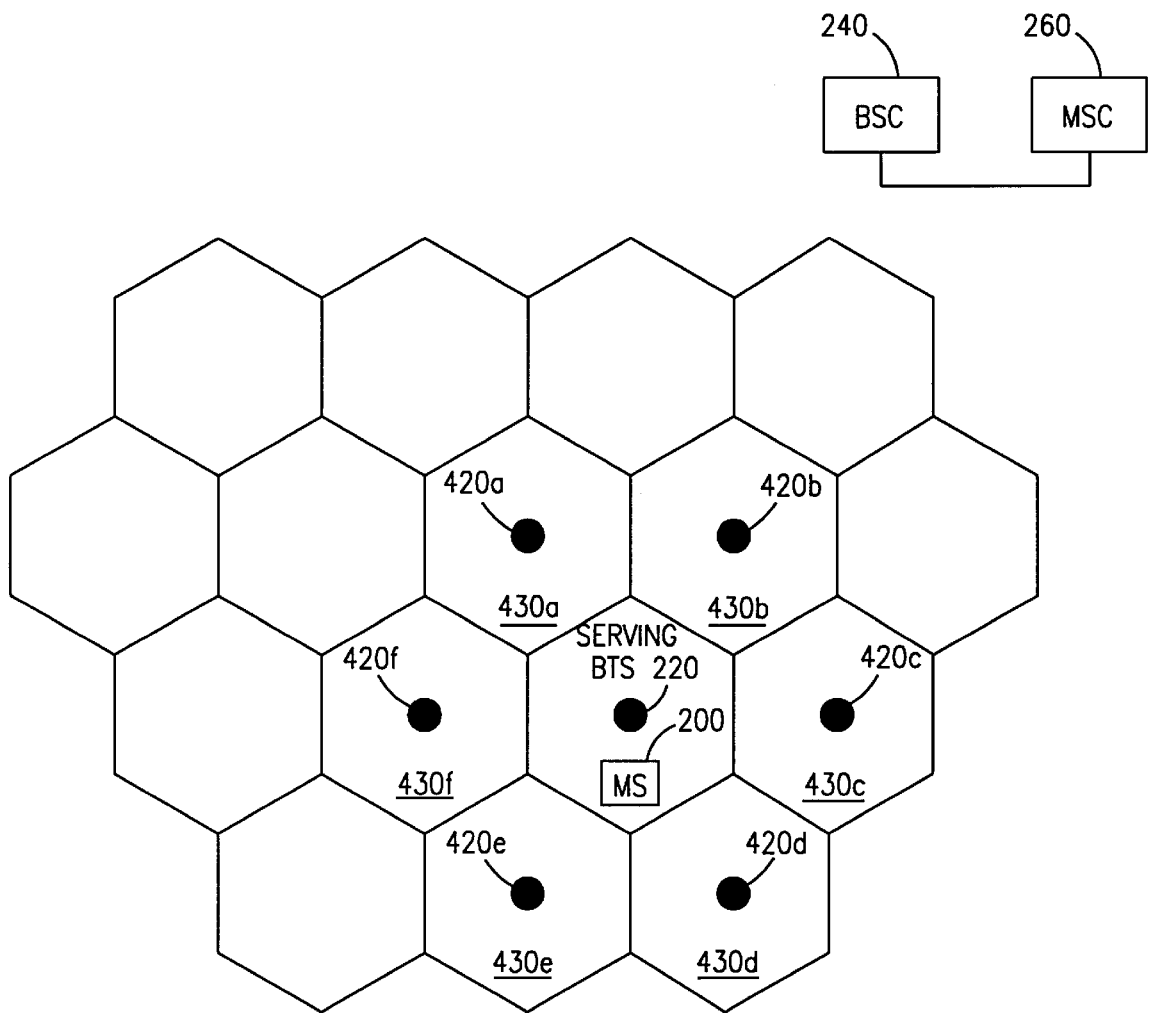
FIG. 4 is an illustration of a mobile telecommunication system embodying the present invention.
FIG. 5 is an exemplary illustration of the path loss determination of Base Transceiver Stations.

Referring now to FIG. 4, which will be discussed in connection with FIGS. 2, and 3, the process by which the BSC 240 selects the target BTSs 210 and 230 (step 320) is described. The MS 200, as in most digital wireless systems, utilizes a method for automatically adjusting its transmitting power based on the strength of the signal received by the serving BTS 220. According to the procedures of Mobile Assisted Hand Over (MAHO), the MS 200 measures the strength of the received signal from the serving BTS 220, as well as a number of BTSs 420a–420f serving each of the six surrounding cells 430a–430f, respectively. These measurements are reported to the BSC 240 in the MS measurement report on the Slow Assisted Control Channel (SACCH) about twice every second.

Upon receiving the measurements in the MS report, the BSC 240 determines the path loss of the serving BTS 220 and each neighboring BTS 420a–420f. Referring now to FIG. 5, an exemplary illustration of the BSC 240 determining the path loss of each neighboring BTS 420a–420f is described. The column referenced as "Received Signal Strength" is provided by the MS 200 in the MS measurement report to the BSC 240. The column referenced as "Output Power" includes data known, stored, and configured by the BSC 240. Those skilled in the art will recognize that the BSC 240 is responsible for controlling the output power of the BTSs 220, and 420a–420f. The BSC 240 can, for example, store data regarding the output power of each BTS 220, and 420a–420f, respectively, in a database 245. The column entitled "Path Loss" represents the path loss of each respective neighboring BTS 420a–420f.

The BSC 240 determines the information in the column entitled "Path loss" according to the following formula:

path loss(n)=output power(n)−received signal strength(n)

where: n=row number.

The BSC 240 then ranks each neighboring BTS 420a–420f in terms of path loss, as illustrated in the column entitled "Rank by path loss." The neighboring BTS 420 which reports the lowest path loss is ranked highest.

Figure 1:
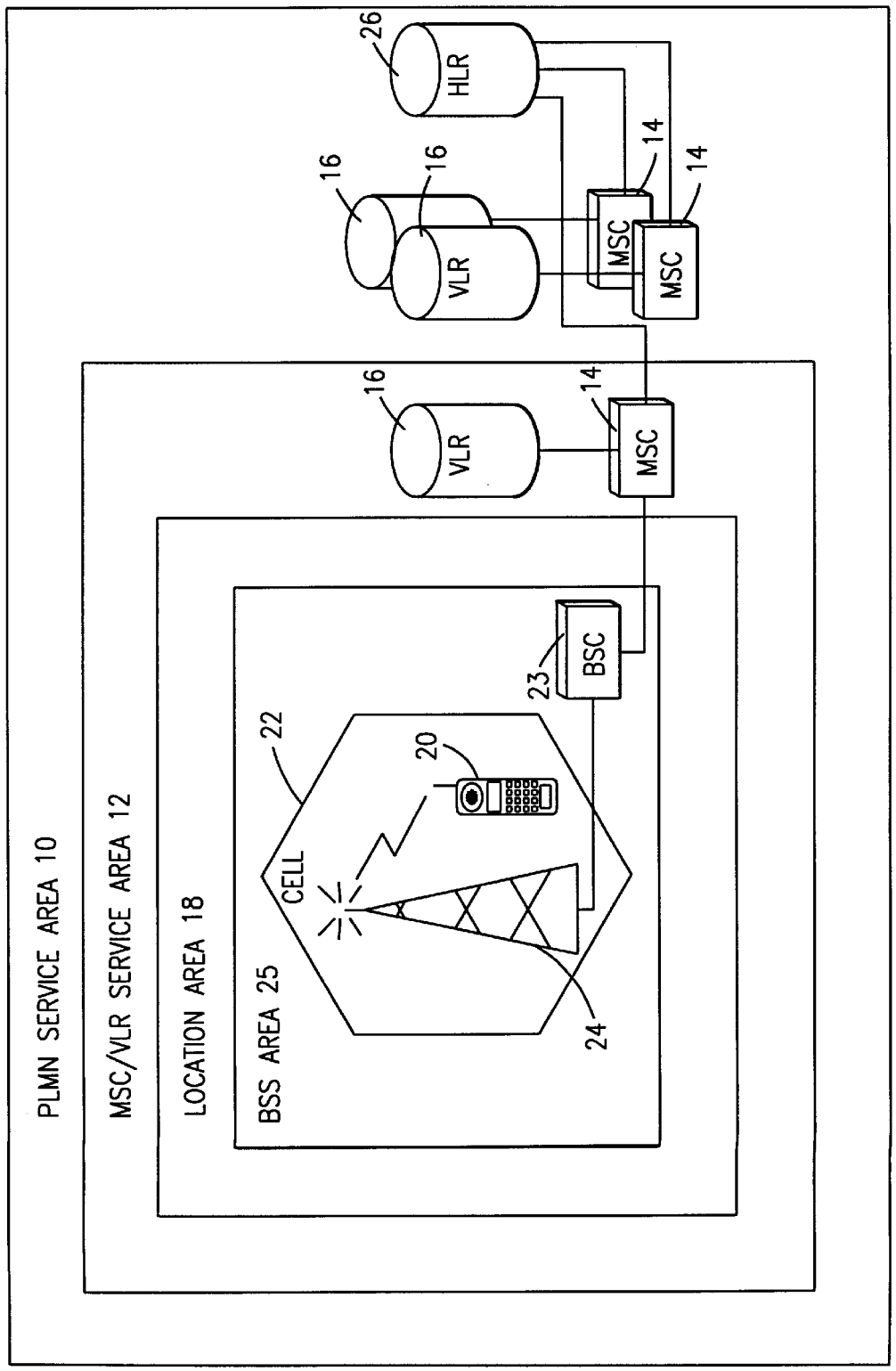
FIG. 1 is a block diagram of a conventional terrestrially-based wireless telecommunications system.
Figure 2:
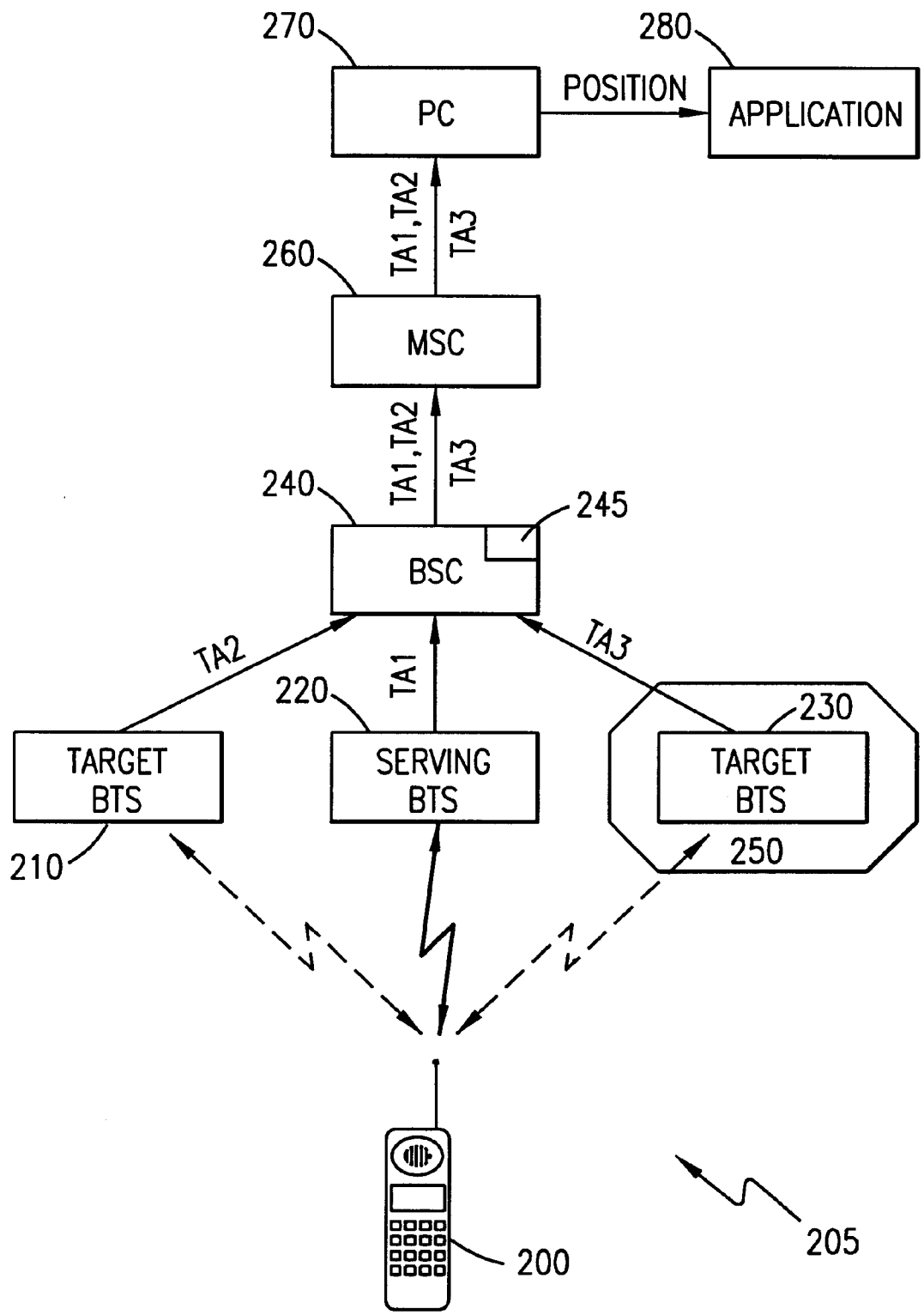
FIG. 2 illustrates a sample positioning handover in which positioning data is acquired by a target base transceiver station and transmitted to a serving base station controller.

The BSC 240 then selects at least two of the neighboring BTSs 420 (at least three if the serving BTS 220 does not support positioning) with the lowest path loss as the aforedescribed target BTSs 210 and 230 of FIG. 2. In the exemplary case of FIG. 5, the BSC 240 would select BTS 420d and BTS 420e, to be the target BTSs 210 and 230.

With reference again to FIG. 3, after step 320 the positioning handover to one of the target BTSs 230 (step 322) is accomplished by the serving BSC 240 sending a new ACTIVATION TYPE in a CHANNEL ACTIVATION message to the target BTS 230, which informs the target BTS 230 that a positioning handover needs to be performed (step 325). The target BTS 230 then acknowledges the CHANNEL ACTIVATION message to the serving BSC 250 (step 330).

Thereafter, the BSC 240 sends a command to the MS 200 via the serving BTS 220 (step 335) to transmit a HANDOVER ACCESS message to the target BTS 230 (step 340). During the time that the MS 200 is waiting for a response from the target BTS 230, e.g., around 320 milliseconds, the target BTS 230 measures the Timing Advance value (access delay) (TA3) (step 345), using access bursts sent by the MS 200, and forwards this positioning data to the serving BSC 240 (step 350). A positioning handover can then be performed to the other target BTS 210 in the same manner as stated hereinbefore. The TA value measured by the target BTS 230 (TA3) is then transmitted by the serving BSC 240 to the MSC 260 (step 355), together with TA values (TA1 and TA2) obtained from the serving BTS 220 and other target BTSs 210.

Finally, the TA value acquired from the target BTS 230 (TA3), together with other TA values (TA1 and TA2) are forwarded to the Positioning Center (PC) 270 from the MSC 260 (step 360), where the location of the MS 200 is determined using the triangulation algorithm (step 365). The PC 270 then presents the geographical position of the MS 200 to the requesting application (node) 280 (step 370) for further processing.

As will be recognized by those skilled in the art, the innovative concepts described in the present application can be modified and varied over a wide range of applications. For example, it should be noted that the aforedescribed determination of optimal target Base Transceiver Stations can be implemented in any cellular system, and should not be limited to GSM systems. For example, in other cellular systems, the Base Station Controller function (controlling node) can be implemented within the MSC (such as 260) itself.

In another embodiment, the selection of the Base Transceiver Stations could be made by the mobile station. In such an embodiment, each Base Transceiver Station would report to the mobile station the transmitting strength. The mobile station could then determine the path loss of each Base Transceiver Station and select the optimal Base Transceiver Stations.

It should also be understood that the present invention is not limited to the selection of two base transceiver stations. For example, in one embodiment, a first base transceiver station can be selected according to path loss while any number of other base transceiver stations can be selected according to some other criteria.

Accordingly, the scope of the present invention should not be limited to any of the specific exemplary teachings discussed, but is only limited by the following claims.

What is claimed is:

1. A method for selecting a positioning handover node, said method comprising the steps of:
   receiving a multiplicity of signals from a corresponding multiplicity of target nodes adjacent to a receiver;
   determining, at said receiver, the strengths of said multiplicity of signals;
   calculating respective path losses for each of said multiplicity of target nodes;
   for a serving node which supports positioning handover:
      calculating a timing advance value associated with said serving node; and
      selecting at least two of said target nodes which support positioning handover, said at least two target nodes having the lowest path loss calculated during said step of calculating; and
   for other serving nodes:
      selecting at least three of said target nodes which support positioning handover, said at least three target nodes having the lowest path loss calculated during said step of calculating; and
   sending a message to said selected target nodes, wherein said message instructs said selected target nodes to calculate respective timing advance values.

2. The method of claim 1, wherein said calculation of said respective timing advance values comprises using access bursts sent by said receiver in response to said receiver receiving a transmit command at least two target nodes are selected during said selecting step, and further comprising the step of:
   determining said location of said receiver using said.

3. The method of claim 2, wherein said transmit command further designating said selected target node to receive said access burst.

4. The method of claim 1, further comprising the step of:
   determining respective distances of said receiver from each selected target node by means of said respective timing advance values.

5. The method of claim 4, further comprising the step of determining a location of said receiver by means of said determined distances.

6. The method of claim 1, wherein said receiver comprises a mobile phone.

7. The method of claim 1, wherein said multiplicity of target nodes comprises a multiplicity of Base Transceiver Stations.

8. The method of claim 7, wherein said calculating step is performed at a Base Station Controller in communication with said multiplicity of target nodes.

9. The method of claim 7, wherein said calculating step is performed at a Mobile Switching Center in communication with said multiplicity of target nodes.

10. A telecommunication system for determining the selection of positioning handover Base Transceiver Stations, said telecommunication system comprising:

a multiplicity of Base Transceiver Stations, each said Base Transceiver Station transmitting a respective signal received by a mobile station;

path loss measuring means for measuring the respective path losses between each of said Base Transceiver Stations and said mobile station; and for a serving Base Transceiver Station which supports positioning handover:

calculating means for calculating a timing advance value associated with said serving Base Transceiver Station; and selecting means for selecting at least two of said multiplicity of Base Transceiver Stations which supports positioning handover, said selected Base Transceiver Stations having the lowest measured path loss; and for other serving Base Transceiver Stations, said selecting means further for selecting at least three of said multiplicity of Base Transceiver Stations which support positioning handover, said selected Base Transceiver Stations having the lowest measured path loss; and message means for sending a message to said selected Base Transceiver Stations, wherein said message instructs said selected Base Transceiver Stations to calculate respective timing advance values.

11. The telecommunication system of claim 10, wherein said calculation of said respective timing advance values comprises using access bursts sent by said mobile station in response to said mobile station receiving a transmit command.

12. The telecommunication system of claim 11, wherein said transmit command further designating said selected Base Transceiver Stations to receive said access burst.

13. The telecommunication system of claim 10, wherein said path loss measuring means comprises a Base Station Controller.

14. The telecommunication system of claim 10, wherein said path loss measuring means comprises a Mobile Switching Center.

15. A selection device for selecting a lowest path loss of target Base Transceiver Station within a telecommunications system, said selection device comprising:

memory means for storing output power data corresponding to a multiplicity of target Base Transceiver Stations within said telecommunications system;

determining means for determining the strength of respective signals transmitted from said multiplicity of Base Transceiver Stations;

calculating means for determining the respective path losses of said multiplicity of Base Transceiver Stations, said path losses comprising the respective differences of the output power of each said Base Transceiver Station and the strength of said signals transmitted therefrom;

for a serving Base Transceiver Station which supports positioning handover:

calculating means for calculating a timing advance value associated with said serving Base Transceiver Station; and selecting means for selecting at least two of said multiplicity of Base Transceiver Stations which supports positioning handover, said selected Base Transceiver Stations having the lowest measured path loss; and for other serving Base Transceiver Stations, said selecting means further for selecting at least three of said multiplicity of Base Transceiver Stations which support positioning handover, said selected Base Transceiver Stations having the lowest measured path loss; and message means for sending a message to said selected Base Transceiver Stations, wherein said message instructs said selected Base Transceiver Stations to calculate respective timing advance values.

16. The selection device of claim 15, further comprising a locator for determining the location of a receiver by means of said at least three calculated timing advance values, said receiver within said telecommunications system.

17. The selection device of claim 15, wherein said determining means comprises receiving means for receiving the strength of said plurality of signals transmitted from said Base Transceiver Stations.

18. The selection device of claim 17, wherein said selection device is a Base Station Controller, a Mobile Services Switching Center, or a Base Transceiver Station.

19. The selection device of claim 15, wherein said receiver is a mobile station.

20. The selection device of claim 19, wherein a Base Station Controller sends a positioning handover request to said selected Base Transceiver Stations, said Base Station Controller further sending a transmit command to said mobile station, said transmit command designating said selected Base Transceiver Stations to receive access bursts, wherein said selected Base Transceiver Stations use said access burst only to determine said timing advance values.

* * * * *

UNITED STATES PATENT AND TRADEMARK OFFICE
CERTIFICATE OF CORRECTION

PATENT NO. : 6,029,070
DATED : February 22, 2000
INVENTOR(S) : Kingdon et al.

It is certified that error appears in the above-identified patent and that said Letters Patent is hereby corrected as shown below:

Column 1,
Line 14, replace "Obiects" with -- Objects --

Column 2,
Line 48, replace "e.a.," with -- e.g., --

Column 6,
Lines 45-48, delete "at least two target nodes are selected during said selecting step, and further comprising the step of: determining said location of said receiver using said"

Signed and Sealed this

Twenty-eighth Day of August, 2001

Attest:

NICHOLAS P. GODICI
Attesting Officer
Acting Director of the United States Patent and Trademark Office